United States Patent
Yi et al.

(10) Patent No.: US 10,127,710 B2
(45) Date of Patent: Nov. 13, 2018

(54) PROCESSOR AND METHOD FOR ACCELERATING RAY CASTING

(71) Applicant: CORELINE SOFT CO., LTD., Seoul (KR)

(72) Inventors: Jaeyoun Yi, Seoul (KR); Ji Min Kim, Chungcheongbuk-Do (KR); Jin Kook Kim, Seoul (KR)

(73) Assignee: CORELINE SOFT CO., LTD., Seoul (KR)

( * ) Notice: Subject to any disclaimer, the term of this patent is extended or adjusted under 35 U.S.C. 154(b) by 0 days.

(21) Appl. No.: 15/168,988

(22) Filed: May 31, 2016

(65) Prior Publication Data

US 2016/0350960 A1 Dec. 1, 2016

(30) Foreign Application Priority Data

May 29, 2015 (KR) .................. 10-2015-0076450

(51) Int. Cl.
*G06T 15/06* (2011.01)

(52) U.S. Cl.
CPC .......... *G06T 15/06* (2013.01); *G06T 2210/41* (2013.01); *G06T 2210/52* (2013.01)

(58) Field of Classification Search
CPC combination set(s) only.
See application file for complete search history.

(56) References Cited

U.S. PATENT DOCUMENTS

| | | | |
|---|---|---|---|
| 6,313,841 B1 | 11/2001 | Ogata et al. | |
| 7,912,264 B2 | 3/2011 | Freiburger et al. | |
| 8,350,846 B2 | 1/2013 | Mejdrich et al. | |
| 8,564,617 B2 | 10/2013 | D'Amora | |
| 8,817,026 B1 * | 8/2014 | Zimmerman | G06T 1/60 345/426 |
| 2009/0027382 A1 * | 1/2009 | Yang | G06T 15/06 345/419 |
| 2009/0262132 A1 * | 10/2009 | Peterson | G06T 15/005 345/619 |

(Continued)

FOREIGN PATENT DOCUMENTS

| | | |
|---|---|---|
| JP | 11-306380 | 11/1999 |
| JP | 2010-176663 | 8/2010 |

(Continued)

*Primary Examiner* — Ryan M Gray
(74) *Attorney, Agent, or Firm* — Mintz Levin Cohn Ferris Glovsky and Popeo, P.C.; Kongsik Kim; Jonathon Western

(57) ABSTRACT

A processor and method for accelerating ray casting are disclosed herein. The processor for accelerating ray casting includes a computation unit, a sorting unit, an allocation unit, and an execution control unit. The computation unit calculates the length information of a section in which a ray corresponding to each of the pixels of a two-dimensional (2D) scene corresponding to a viewpoint intersects an effective volume in order to apply ray casting to the pixel. The sorting unit sorts the ray based on the length information of the section in which the ray intersects the effective volume. The allocation unit allocates the sorted rays to respective thread groups having a parallel multiprocessor structure in order of the sorting. The execution control unit transfers control instructions to the allocated thread groups so that the allocated thread groups execute ray casting for the sorted rays.

15 Claims, 14 Drawing Sheets

(56) References Cited

U.S. PATENT DOCUMENTS

| | | | |
|---|---|---|---|
| 2010/0284597 A1 | 11/2010 | Lee et al. | |
| 2011/0043521 A1* | 2/2011 | Smyth | G06T 15/06 |
| | | | 345/424 |
| 2011/0228055 A1* | 9/2011 | Sharp | G06T 15/06 |
| | | | 348/51 |
| 2012/0128218 A1 | 5/2012 | Amyot et al. | |
| 2013/0265318 A1 | 10/2013 | Schneider | |
| 2014/0015834 A1* | 1/2014 | Kho | G06T 11/001 |
| | | | 345/426 |
| 2014/0192054 A1 | 7/2014 | Yoo et al. | |
| 2015/0106819 A1 | 4/2015 | Kim et al. | |
| 2015/0269768 A1* | 9/2015 | Sohn | G06T 15/08 |
| | | | 345/424 |

FOREIGN PATENT DOCUMENTS

| | | |
|---|---|---|
| JP | 2010-259809 | 11/2010 |
| KR | 10-0261278 B1 | 7/2000 |
| KR | 10-0656861 B1 | 12/2006 |
| KR | 10-0674428 B1 | 1/2007 |
| KR | 10-0767040 B1 | 10/2007 |
| KR | 10-1075014 B1 | 10/2011 |
| KR | 10-1117913 | 2/2012 |
| KR | 10-2015-0043066 A | 4/2015 |

* cited by examiner

PROCESSOR AND METHOD FOR ACCELERATING RAY CASTING

CROSS-REFERENCE TO RELATED APPLICATION

This application claims under 35 U.S.C. § 119(a) the benefit of Korean Application No. 10-2015-0076450 filed on May 29, 2015, which is incorporated herein by reference.

TECHNICAL FIELD

The present invention relates generally to a method and a processor for accelerating ray casting, and more particularly to a method and a processor for accelerating ray casting, which are capable of improving the speed of volume rendering.

BACKGROUND ART

Generally, three-dimensional (3D) medical imaging systems refer to systems for providing medical data as visual information useful for diagnosis using various techniques. In this case, the medical data refers to data that is created by reconstructing information about a bodily organ in a superimposed cross sectional form, obtained through Computerized Tomography (CT) or Magnetic Resonance (MR), into a 3D form.

Recently, with the rapid advance of the technology of medical imaging equipment such as a CT scanner or an MR scanner, a precise image can be acquired within a short period of time. Actually, in hospitals, hundreds or thousands of images are being generated for a single medical examination. Meanwhile, although such a large amount of image information provides useful diagnosis information, it takes an excessively long time and many efforts to read images one by one, as in a conventional method of reading two-dimensional (2D) images.

A system that was developed to overcome the above problem is a 3D medical imaging system. This system renders 3D medical image data as visual information useful for diagnosis using a Direct Volume Rendering (DVR) technique, a Maximum Intensity Projection (MIP) rendering technique, and a Multi Planar Reformatting (MPR) technique.

A common 3D medial image rendering technique is performed based on a viewpoint, the direction of a line of sight, a plane containing an output scene, and a model composed of a target object, and may be described with reference to FIG. 1.

FIG. 1 is a diagram illustrating a general 3D rendering method. Referring to FIG. 1, in the case of the general 3D rendering method, a rectilinear line that connects a pixel of an output scene 2 and a viewpoint 1 is referred to as a ray 3. A final scene is generated by applying various techniques to densities obtained by sampling individual points while the ray 3 is passing through volume data 5.

In this case, the MIP rendering technique, which is one of the 3D rendering methods, is a method of finding a maximum density while moving along a ray. Meanwhile, since the MIP technique renders a scene while taking into account only the maximum value of density, this scene is characterized in that depth information is lost unlike in a DVR scene, and thus a disadvantage arises in that a user estimates depth while frequently changing an observation direction.

In order to overcome this problem, research into a technology for generating MIP scenes at rapid speed to deal with frequent changes in an observation direction has been conducted in various manners. As an example of this technology, there is a so-called leaping technique that determines an unnecessary area of medical data determined not to be incorporated into a final output scene and then skips the calculation thereof.

However, although the leaping technique has the advantage of accelerating the generation of a final scene without influencing image quality, it has a disadvantage in which the time required to detect the unnecessary area and the amount of additional memory required to store information about the unnecessary area must be taken into account.

For example, a method for sorting overall data constituting a medical scene in descending order of density values and then starting rendering from the highest value has problems in that a long sorting time is required and the amount of additional memory is large.

Meanwhile, Korean Patent No. 10-1075014 entitled "Method of Accelerating MIP Rendering Using Parallel Ray Casting and Space Leaping" relates to a method of accelerating MIP rendering, which generates a plurality of medical scenes, photographed by 3D medical imaging equipment, as visual information useful for diagnosis. In particular, this patent proposes a method of accelerating MIP rendering using ray casting, which can reduce preprocessing time by means of a method that performs ray casting and block processing in parallel and moves through blocks while comparing a ray value with a per-block maximum value, and which can rapidly acquire MIP scenes using only general-purpose hardware.

This preceding technology is directed to a technology that combines a plurality of voxels into blocks, acquires brightness and a maximum value for each of the blocks, compares the acquired value with a maximum value for a ray under current calculation, and then performs a block-based leaping, thereby reducing time. This technology aims to reduce computational load in a single ray by performing a block-based leaping when acquiring a maximum value in the single ray, but does not take into account the order of the calculations of a plurality of rays.

SUMMARY OF THE DISCLOSURE

Accordingly, the present invention has been made keeping in mind the above problems occurring in the prior art, and an object of the present invention is to provide a method and apparatus for accelerating ray casting, more particularly a method and apparatus for accelerating ray casting, which are capable of improving the speed of volume rendering.

An object of the present invention is to provide a technology that is capable of improving rendering speed using ray casting in a GPU, multi-core, or parallel processing environment.

An object of the present invention is to accelerate ray casting by allocating an output pixel block of rays requiring similar operation times to a single thread group.

An object of the present invention is to reduce total work time by minimizing work time per block in a General-Purpose computing on Graphics Processing Units (GPGPU) device, such as a Compute Unified Device Architecture (CUDA).

An object of the present invention is to provide a rendering technology that is applicable to a medical imaging field.

In accordance with an aspect of the present invention, there is provided a method of accelerating ray casting in a computing system, including: calculating the length information of a section in which a ray corresponding to each of the pixels of a two-dimensional (2D) scene corresponding to a viewpoint intersects an effective volume in order to apply ray casting to the pixel; sorting the ray based on the length information of the section in which the ray intersects the effective volume; and allocating the sorted rays to thread groups having a parallel multiprocessor structure in order of the sorting.

The method may further include performing ray casting for the sorted rays using the allocated thread groups, mapping the results of the ray casting for the sorted rays to respective pixels that belong to the pixels of the 2D scene and correspond to the sorted rays, and generating the 2D scene by combining mapped pixel scenes.

The calculating the length information of the section in which the ray intersects the effective volume may include: acquiring a first intersection at which the ray intersects the effective volume in a first direction; acquiring a second intersection at which the ray intersects the effective volume in a second direction; and generating, for the ray, the distance between the first intersection and the second intersection as the length information. The calculating the length information of the section in which the ray intersects the effective volume may include counting a number of effective voxels that the ray intersects within the effective volume, and generating the number of effective voxels counted for the ray as the length information, or may include generating first voxels which belong to voxels intersected by the ray and whose brightness value satisfies reference conditions, as the effective volume.

In accordance with another aspect of the present invention, there is provided a method of accelerating ray casting in a computing system, including: collecting information about the surfaces of an effective volume from overall volume data, and generating a surface model based on the information about surfaces of the effective volume; acquiring the depth information of each of the pixels of a 2D scene corresponding to a viewpoint for the surface model in each of first and second directions in order to apply ray casting for the surface model to the pixel; and calculating the length information of the effective section of the pixel for the application of ray casting using the depth information acquired in each of the first and second directions.

The generating the surface model may include: dividing the overall volume data into a plurality of blocks each including a plurality of voxels; identifying a surface of an effective block, which belongs to the plurality of blocks and which satisfies reference conditions, for each reference direction; and collecting information about the identified surfaces of the effective block and generating the surface model based on the information about the identified surfaces of the effective block.

The calculating the length information of the effective section of the pixel may include calculating the length information of the effective section of the pixel by taking into account first depth information acquired for the first direction, second depth information acquired for the second direction, and a reference length determined by the viewpoint. In this case, the reference length may be determined by taking into account information about a relative location at which the pixel is located within the overall volume data and the viewpoint.

The acquiring the depth information of each of the pixels for the surface model may be performed in parallel by allocating the pixels to a plurality of respective multiprocessor cores capable of performing parallel operations.

In accordance with still another aspect of the present invention, there is provided a processor for accelerating ray casting, including: a computation unit configured to calculate the length information of a section in which a ray corresponding to each of the pixels of a two-dimensional (2D) scene corresponding to a viewpoint intersects an effective volume in order to apply ray casting to the pixel; a sorting unit configured to sort the ray based on the length information of the section in which the ray intersects the effective volume; an allocation unit configured to allocate the sorted rays to respective thread groups having a parallel multiprocessor structure in order of the sorting; and an execution control unit configured to transfer control instructions to the allocated thread groups so that the allocated thread groups execute ray casting for the sorted rays.

The computation unit may be further configured to acquire a first intersection at which the ray intersects the effective volume in a first direction, to acquire a second intersection at which the ray intersects the effective volume in a second direction, and to generate, for the ray, the distance between the first intersection and the second intersection as the length information, or may be further configured to generate first voxels which belong to voxels intersected by the ray and whose brightness value satisfies reference conditions as the effective volume.

In accordance with still another aspect of the present invention, there is provided a processor for accelerating ray casting, including: a sample model generation unit configured to collect information about the surfaces of an effective volume from overall volume data, and to generate a surface model based on the information about surfaces of the effective volume; an acquisition unit configured to acquire the depth information of each of the pixels of a 2D scene corresponding to a viewpoint for the surface model in each of first and second directions in order to apply ray casting for the surface model to the pixel; and a computation unit configured to calculate the length information of the effective section of the pixel for the application of ray casting using the depth information acquired in each of the first and second directions.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE DISCLOSURE

Embodiments of the present invention will be described in detail below with reference to the accompanying drawings. In the following description, detailed descriptions of related known components or functions that may unnecessarily make the gist of the present invention obscure will be omitted. Furthermore, in the following description of embodiments of the present invention, specific numerical values are merely examples.

The present invention relates to a method and apparatus for accelerating ray casting, and more particularly to an accelerating method and apparatus that are capable of improving the speed of rendering using ray casting in a graphics processing unit (GPU), multi-core, or parallel processing environment. First, the overall operation flow of an apparatus 200 for accelerating ray casting according to an embodiment of the present invention is described in brief with reference to FIG. 2.

Figure 1:
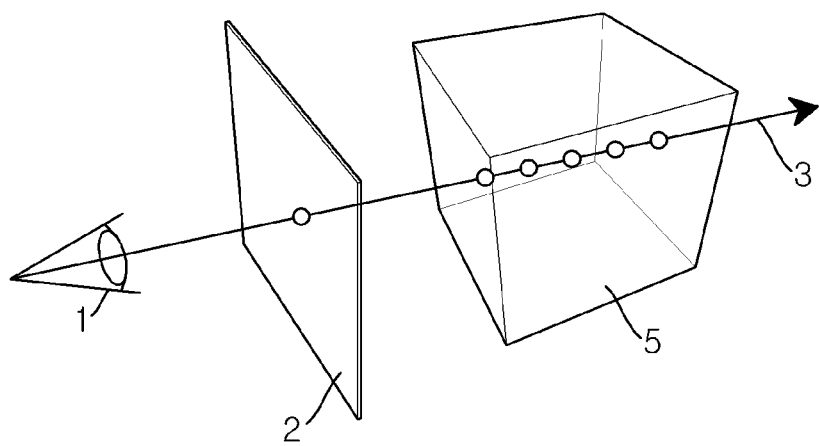
FIG. 1 is a diagram illustrating a general 3D rendering method.
Figure 2:
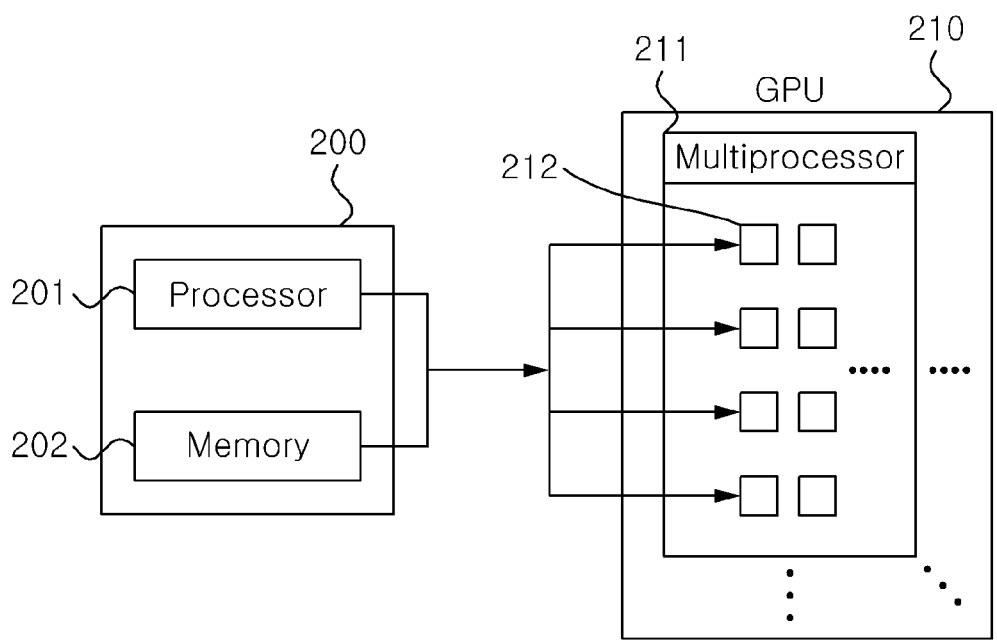
FIG. 2 is a conceptual diagram illustrating the overall operation flow of a processor for accelerating ray casting according to an embodiment of the present invention.

FIG. 2 is a conceptual diagram illustrating the overall operation flow of the apparatus 200 for accelerating ray casting according to the embodiment of the present invention.

Referring to FIG. 2, the apparatus 200 for accelerating ray casting according to the embodiment of the present invention may include a processor 201 and memory 202. In this case, data processed by the processor 201 may be stored in the memory 202, and the processor 201 may receive data from the memory 202 and perform an operation on the data.

Furthermore, the apparatus 200 for accelerating ray casting according to the present invention may implement ray casting using Compute Unified Device Architecture (CUDA), OpenCL, or the like, which are parallel integrated processing modes. For this purpose, the apparatus 200 for accelerating ray casting may send data, processed by the processor 201 or stored in the memory 202, to a GPU 210. Thereafter, a CPU (not shown) may send instructions to be processed to the GPU 210, in which case an API function of the CUDA library or the like may be used. Furthermore, a multiprocessor 211 within the GPU 210 may perform control so that the data received from the apparatus 200 for accelerating ray casting is processed by individual cores 212 in parallel.

In the following, embodiments of various configurations of the apparatus 200 for accelerating ray casting proposed by the present invention are described.

Figure 3:
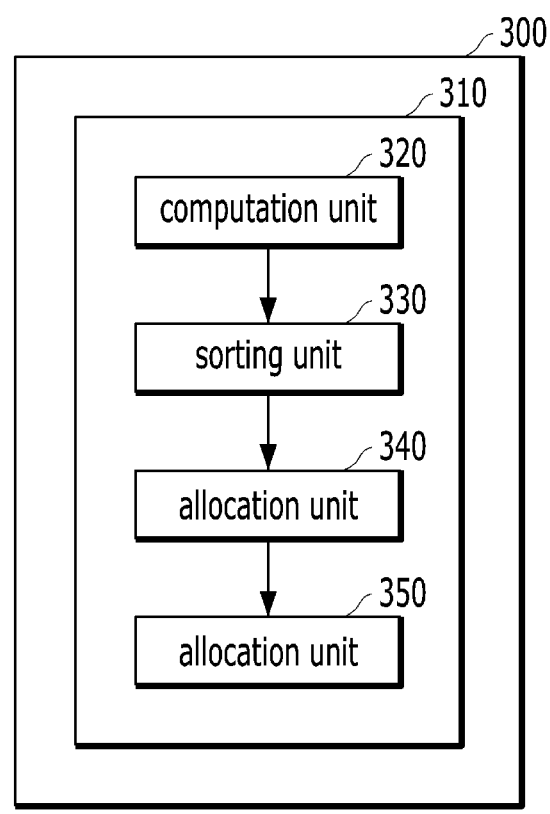
FIG. 3 is a first exemplary diagram of a processor for accelerating ray casting according to an embodiment of the present invention.

FIG. 3 is a first diagram of an apparatus 300 for accelerating ray casting according to an embodiment of the present invention.

Referring to FIG. 3, the apparatus 300 for accelerating ray casting according to the embodiment of the present invention may include a processor 310, and the processor 310 may include a computation unit 320, a sorting unit 330, an allocation unit 340, and an execution control unit 350.

The computation unit 320 calculates the length information of a section in which a ray corresponding to each of the pixels of a 2D scene corresponding to a viewpoint (that is, the direction of viewing) intersects an effective volume in order to apply ray casting to the pixel.

In this case, methods of calculating the length information of a section in which a ray intersects an effective volume include two methods. A first method may perform calculation by using the distance between intersections at which a ray intersects an effective volume in first and second directions, and a second method may perform calculation by counting the number of effective voxels that a ray intersects within an effective volume.

That is, in the former case (the first method), the computation unit 320 may obtain a first intersection at which the ray intersects the effective volume in the first direction, may obtain a second intersection at which the ray intersects the effective volume in the second direction, and may generate the distance between the first and second intersections for the ray as the length information, thereby calculating the length information of the section in which the ray intersects the effective volume.

In this case, the first direction may refer to a forward direction in which ray casting is executed from a viewpoint in the direction of an effective volume, and the second direction may refer to a reverse direction that is opposite to the first direction. In this case, according to another embodiment of the present invention, the first direction may be a reverse direction, and the second direction may be a forward direction.

Meanwhile, in the latter case (the second method), the computation unit 320 may count the number of effective voxels that the ray intersects within the effective volume, and may generate the number of effective voxels counted for the ray as the length information, thereby calculating the length information of a section in which the ray intersects the effective volume.

Figure 6:
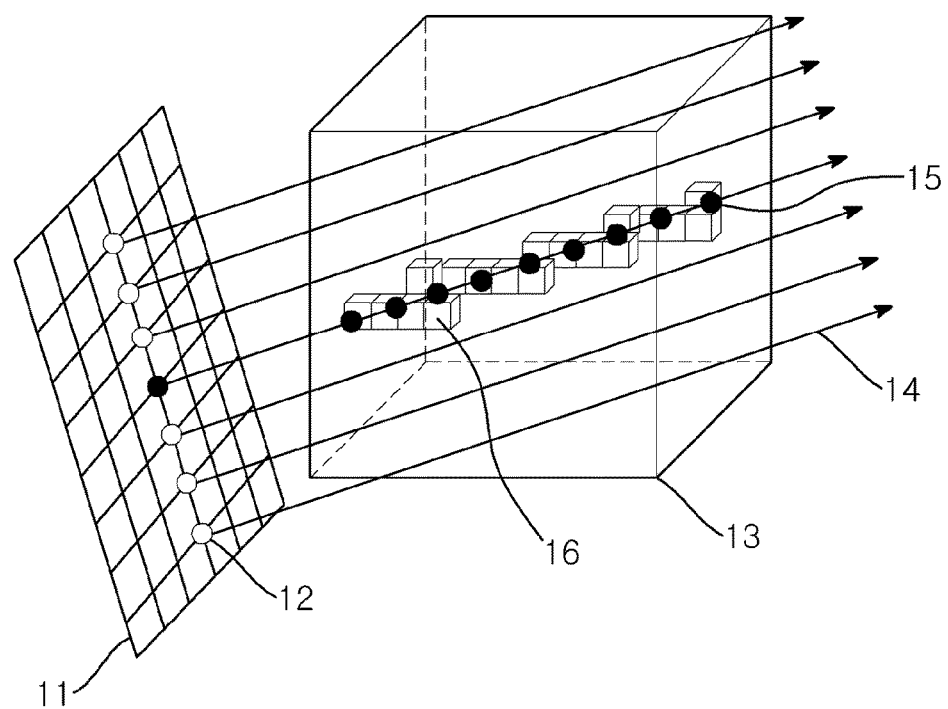
FIG. 6 is a first exemplary diagram illustrating the concept of ray casting.
Figure 7:
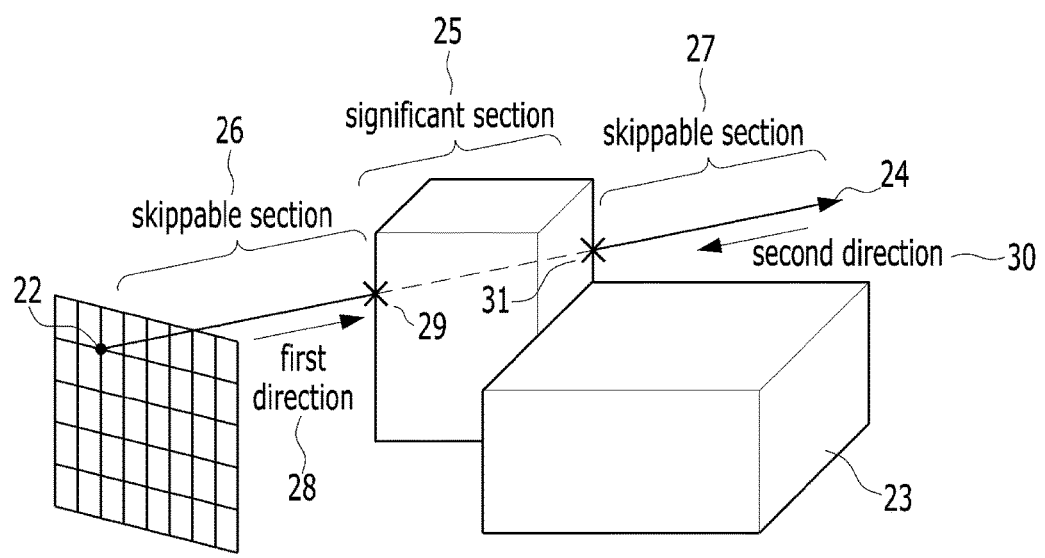
FIG. 7 is a second exemplary diagram illustrating the concept of ray casting.

The present invention is further described to help an understanding of the present invention with reference to FIGS. 6 and 7.

FIG. 6 is a first diagram illustrating the concept of ray casting.

Referring to FIG. 6, in conventional ray casting, a virtual ray 14 is emitted from each pixel 12 of a 2D scene 11 in the direction of overall volume data 13 and then sampling is performed at predetermined intervals of the ray 14. Thereafter, the colors and opacity values of a corresponding volume 16 are calculated and accumulated at each sample point 15 on the ray 14 that intersects volumes 16 having effective values, and thus the color value of the corresponding pixel 12 is determined. Meanwhile, the above-described conventional rendering method has a disadvantage in that the speed of rendering is low because an accumulation operation is repeatedly performed in order to incorporate color information, acquired at each sample point, into final color.

In order to overcome this problem, without performing a conventional process of calculating color and an opacity value for each voxel at each sample point 15 on a ray 14 that intersects each volume 16 having an effective value and then performing an accumulation operation, the apparatus 300 for accelerating ray casting according to an embodiment of the present invention rapidly calculates the length information of a section, in which voxels 16 having an effective value are intersected, using depth information for a surface model (in this case, length information may be acquired using a first point and a second point or using information about the number of voxels intersected by a ray in a corresponding section), and sorts the ray and allocates the rays to thread groups based on the length information, thereby accelerating the speed of ray casting-based rendering. A more detailed description thereof will be given below.

Meanwhile, in the case of the conventional ray casting shown in FIG. 6, as described above, color and an opacity value are calculated at each voxel, and thus the acceleration of rendering is limited. Accordingly, in order to accelerate rendering, a reduction in computational load for each ray is required. For this purpose, it is necessary to efficiently skip a space in which an effective voxel does not appear.

FIG. 7 is a second diagram illustrating the concept of ray casting.

Referring to FIG. 7, in rendering, a volume space may be classified as a skippable space that does not considerably exert a meaningful influence on the amount of rendering computation (which may refer to a space in which an empty volume, a transparent volume or the like is located) and as a significant space that exerts a meaningful influence on the amount of rendering computation (which may refer to a space in which an effective volume, an opaque volume or the like is located).

Furthermore, as an example, when a ray 24 emitted from a pixel 22 of a 2D scene 21 corresponding to a viewpoint (that is, the direction of viewing) passes through a volume space, the volume space may be classified into a skippable section 26 and a significant section 25 based on the emission path of the ray 24. In this case, the significant section 25 refers to a section in which the ray 24 intersects an effective volume 23 or an opaque volume. Through this process, the processor 310 according to an embodiment of the present invention may acquire the length information of the significant section for the ray emitted from each pixel of the 2D scene 21 via the computation unit 320, and then may sort the ray based on the length information via the sorting unit 330.

Furthermore, referring to FIG. 7, the direction of the ray 24 emitted from the first pixel 22 in the direction of the effective volume 23 may be referred to as a first direction (a forward direction 28), and a direction opposite to the first direction may be referred to as a second direction (a reverse direction 30). In this case, in an embodiment of the present invention, a point at which a ray emitted in the first direction 28 intersects the effective volume 23 may be referred to as a first intersection 29, and a point at which a ray emitted in the second direction 30 intersects the effective volume 23 may be referred to as a second intersection 31. The computation unit 320 according to an embodiment of the present invention may calculate length information for each ray by using the distance between the first intersection 29 and the second intersection 31 or by counting the number of effective voxels that the ray intersects within the effective volume 23.

Furthermore, the computation unit 320 may calculate length information for each ray by generating voxels, which are intersected by the ray and whose brightness values satisfy reference conditions, as the effective volume. That is, the computation unit 320 may classify a volume space into a transparent volume (an empty volume or a skippable volume) and an opaque volume (an effective volume or a significant volume) according to the reference conditions, and may define a significant volume area using an opacity transfer function (OTF).

As an example, when brightness values are classified into levels 1 (brightest) to 10 (darkest), the computation unit 320 may classify a volume having brightness corresponding to one of levels 1 to 3 as a transparent volume, may classify a volume having brightness corresponding to one of levels 4 to 10 as an opaque volume, and may count the number of voxels for the opaque volume. Alternatively, the length information between a first intersection and a second intersection at which rays emitted in first and second directions intersect a volume having level 4 or higher first may be acquired.

The sorting unit 330 sorts the ray based on the length information which is calculated by the computation unit 320 and in which the ray intersects the effective volume. In this case, the sorting unit 330 may sort rays corresponding to respective pixels of a 2D scene in descending order of length information or in ascending order of length information. Furthermore, the sorting unit 330 may sort pixels of a 2D scene corresponding to rays in descending order of length information for the ray or in ascending order of length information.

The processor 310 according to an embodiment of the present invention may further include a grouping unit (not shown) as desired, and the grouping unit may group rays or pixels, sorted by the sorting unit 330, according to preset rules.

In this case, the grouping unit may group a predetermined number of sorted rays or pixels in ascending or descending order. Furthermore, since the fact that the length information of a ray is long means that a long operation time is taken when a pixel corresponding to the ray is rendered, the grouping unit may group a predetermined number of rays or pixels requiring similar operation times.

The allocation unit 340 may allocate the rays, sorted by the sorting unit 330, to thread groups having a parallel multiprocessor structure in order of the sorting. In this case, the allocation unit 340 may allocate the individual sorted rays to thread groups, or may allocate ray groups of a predetermined number of grouped rays to thread groups.

Figure 8:
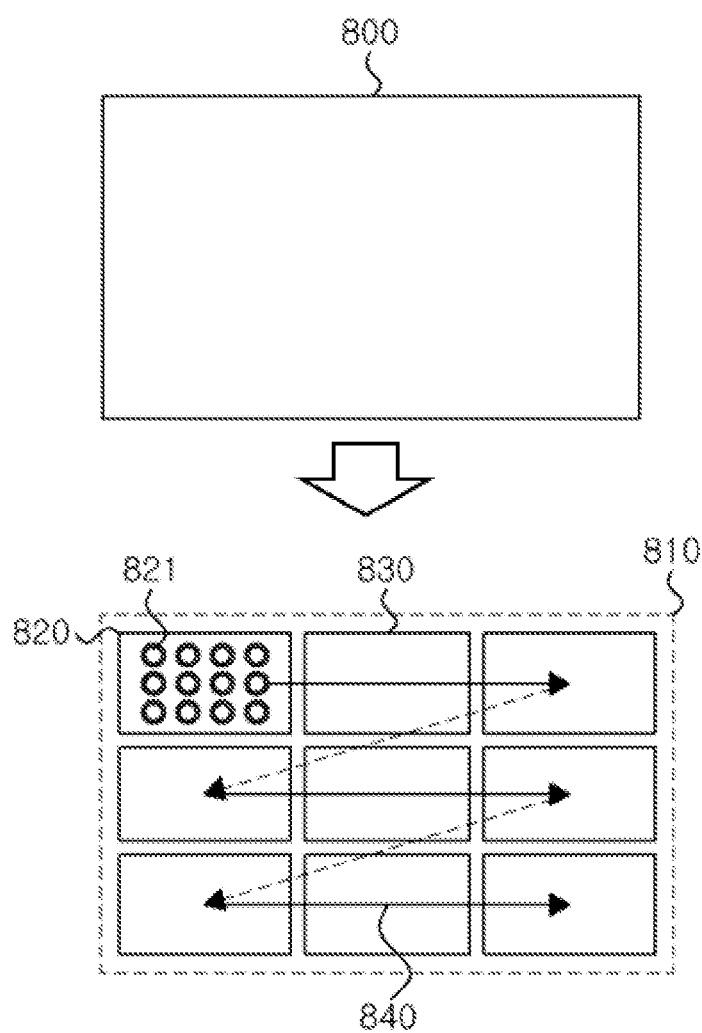
FIG. 8 is a diagram illustrating an example of the execution of thread groups.

FIG. 8 is a diagram illustrating an example of the execution of thread groups.

Referring to FIG. 8, in rendering, a final output scene 800 may be viewed as having been divided into a plurality of thread groups 810. In this case, a thread refers to an execution path that is present within a process when a computer program is executed, or the unit of a job to which time can be allocated by a job scheduler and which be then performed in a CPU.

Furthermore, when ray casting is implemented in a multicore, such as a GPU or the like, or when ray casting is implemented using a technology, such as nVidia CUDA or the like, a single thread calculates a single ray, and a plurality of threads operates as a group. Furthermore, threads within a group are simultaneously executed, and a subsequent group is executed only if all the threads within the group have been terminated.

In other words, when the execution order 840 of a plurality of thread groups is as shown in FIG. 8, a first thread group 820 is executed first, and a second thread group 830 is executed only if all threads within the first thread group 820 have been terminated. In this case, a plurality of threads may be present within the first thread group 820, in which case a single thread 821 may refer to a single ray or a single pixel.

Furthermore, as described above, with regard to the plurality of thread groups 810, the second thread group 830, i.e., a subsequent group, is executed only if all threads within the first thread group 820 have been terminated. In this case, the operation time of each thread group is dependent upon a ray that takes the longest operation time within a corresponding thread group, and thus total work time is dependent upon how to allocate rays to thread groups.

Meanwhile, in the conventional ray casting-based acceleration methods, while color and an opacity value are being calculated for each voxel during ray casting, a plurality of rays is randomly allocated to a thread group. Accordingly, the conventional technologies do not take into account total work time, and thus they have their limitations in terms of an improvement in the speed of a rendering task.

Figure 9:
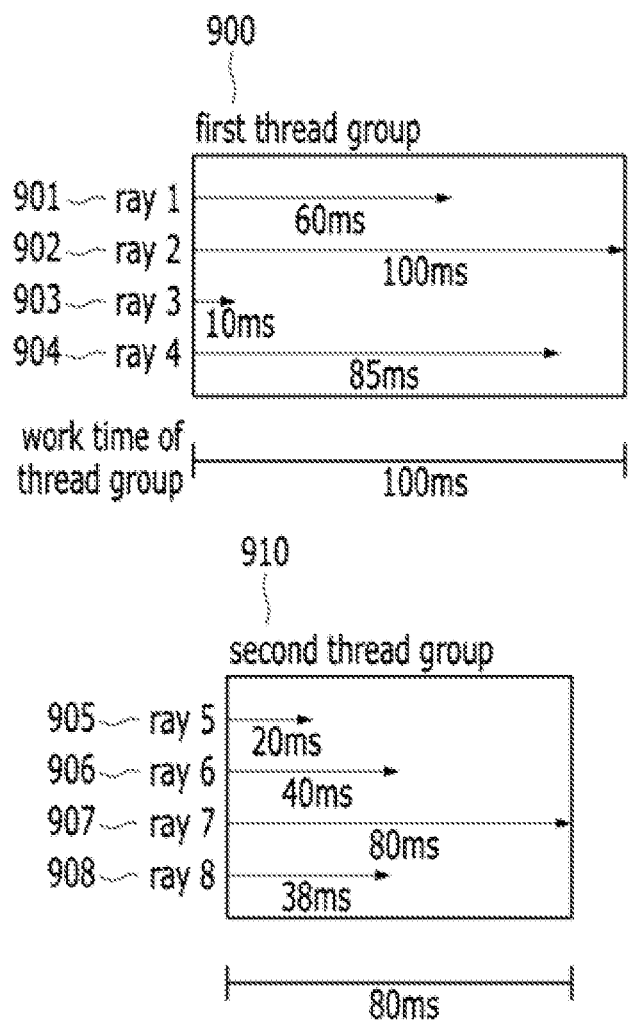
FIG. 9 is a diagram showing an example in which rays are allocated to thread groups according to a conventional technology.
Figure 10:
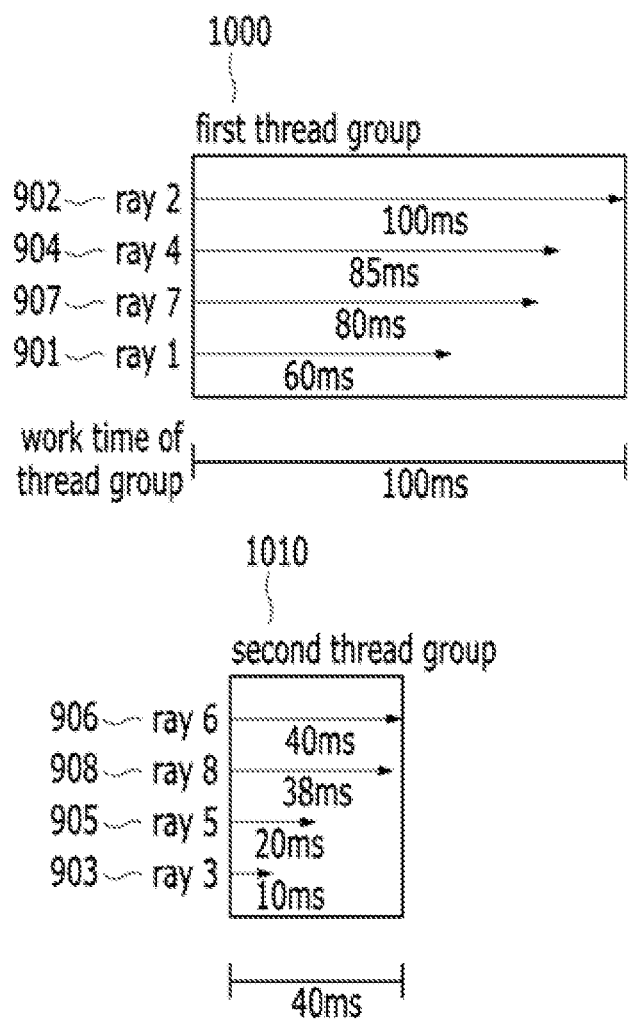
FIG. 10 is a diagram showing an example in which rays are allocated to thread groups according to an embodiment of the present invention.

Examples in which rays are allocated to thread groups according to the conventional technology and an embodiment of the present invention are described with reference to FIGS. 9 and 10 below. In FIGS. 9 and 10, the length of each arrow is indicative of work time for a corresponding ray. In this case, as an example, the unit of work time may be milliseconds. Furthermore, although examples in which rays are allocated to thread groups are shown in FIGS. 9 and 10, the present invention is not limited thereto. In another example, pixels including the length information of rays may be allocated to thread groups.

FIG. 9 is a diagram showing an example in which rays are allocated to thread groups according to the conventional technology, and FIG. 10 is a diagram showing an example in which rays are allocated to thread groups according to an embodiment of the present invention.

First, referring to FIG. 9, as an example, according to the conventional technology, ray 1 901 requiring a work time of 60 ms, ray 2 902 requiring a work time of 100 ms, ray 3 903 requiring a work time of 10 ms, and ray 4 904 requiring a work time of 85 ms may be allocated to a first thread group 900. Furthermore, ray 5 905 requiring a work time of 20 ms, ray 6 906 requiring a work time of 40 ms, ray 7 907 requiring a work time of 80 ms, and ray 8 908 requiring a work time of 38 ms may be allocated to a second thread group 910.

Accordingly, since the work time of the first thread group 900 is 100 ms depending on ray 2 902 and the work time of the second thread group 910 is 80 ms depending on ray 7 907, the total work time (that is, the sum of the work time of the first thread group 900 and the work time of the second thread group 910) according the conventional allocation method is 180 ms.

Meanwhile, an example in which rays are allocated according to the embodiment of the present invention, which is compared with FIG. 9, is as follows. First, according to the embodiment of the present invention, the sorting unit 330 may sort ray 1 901 to ray 8 908, shown in FIG. 9, in descending order of work time.

In this case, in the embodiment of the present invention, the length information for a corresponding ray calculated by the computation unit 320 is considered to be the work time. That is, the work time may correspond to length information generated based on the distance between first and second intersections, or may correspond to length information generated based on information about the number of counted effective voxels.

Furthermore, after the rays have been sorted by the computation unit 320, the allocation unit 340 may allocate the rays to thread groups in order of the sorting, i.e., in descending order of work time, according to an embodiment of the present invention. In this case, a maximum of four rays may be allocated to a single thread group.

Accordingly, referring to FIG. 10, as an example, according to the embodiment of the present invention, ray 2 902 requiring a work time of 100 ms, ray 4 904 requiring a work time of 85 ms, ray 7 907 requiring a work time of 80 ms, and ray 1 901 requiring a work time of 60 ms may be allocated to a first thread group 1000, and ray 6 906 requiring a work time of 40 ms, ray 8 908 requiring a work time of 38 ms, ray 5 905 requiring a work time of 20 ms, and ray 3 903 requiring a work time of 10 ms may be allocated to a second thread group 1010, in descending order of work time or in descending order of length information for the rays.

Accordingly, since the work time of the first thread group 1000 is 100 ms depending on ray 2 902 and the work time of the second thread group 1010 is 40 ms depending on ray 6 906, a total work time according to the embodiment of the present invention is 140 ms.

As described above, it can be seen that the total work time of 140 ms based on the allocation method according to the embodiment of the present invention has been reduced by 40 ms compared to the total work time of 180 ms according to the conventional allocation method. This means that the embodiment of the present invention can accelerate ray casting by the reduced time of 40 ms compared to the conventional technology.

Furthermore, although the example in which rays are allocated to thread groups according to the embodiment of the present invention is shown in FIG. 10, the present invention is not limited thereto. In another embodiment, ray groups of a predetermined number of grouped rays may be allocated to thread groups using the above-described grouping unit (not shown). For example, in the case of FIG. 10, after the sorting unit 330 has sorted rays, the grouping unit may group ray 2 902 and ray 4 904 as a first group and group ray 7 907 and ray 1 901 as a second group. Thereafter, the allocation unit 340 may allocate the first group and the second group to the first thread group 1000.

Meanwhile, according to an embodiment of the present invention, when calculating length information for each ray via the computation unit 320, the processor 310 may calculate the length information by more rapidly estimating the length information for the ray based on depth information for a surface model, rather than calculating the length information by actually executing ray casting.

That is, according to the embodiment of the present invention, the processor 310 may calculate length information by estimating the length information for a ray using depth information for a surface model (which will be described in greater detail below) via the computation unit 320 first, may sort the ray by taking into account the length information for the ray via the sorting unit 330, and may allocate the sorted rays to respective thread groups via the allocation unit 340. Thereafter, the execution control unit 350 may transfer control instructions to the allocated thread groups so that the thread groups allocated by the allocation unit 340 can execute ray casting for the sorted rays. Thereafter, ray casting may be executed in the GPU or CUDA in order of the sorted rays.

Furthermore, according to an embodiment of the present invention, the processor 310 may generate a 2D scene by allocating the results of the ray casting to the respective pixels according to the original location information of the rays. For this purpose, the processor 310 may further include a mapping unit (not shown) and a scene acquisition unit (not shown).

In this case, the mapping unit may map the results of the ray casting for the sorted rays to respective pixels that belong to the pixels of the 2D scene and correspond to the sorted rays, and the scene generation unit may generate a 2D scene by combining pixel scenes obtained through the mapping of the mapping unit.

Figure 4:
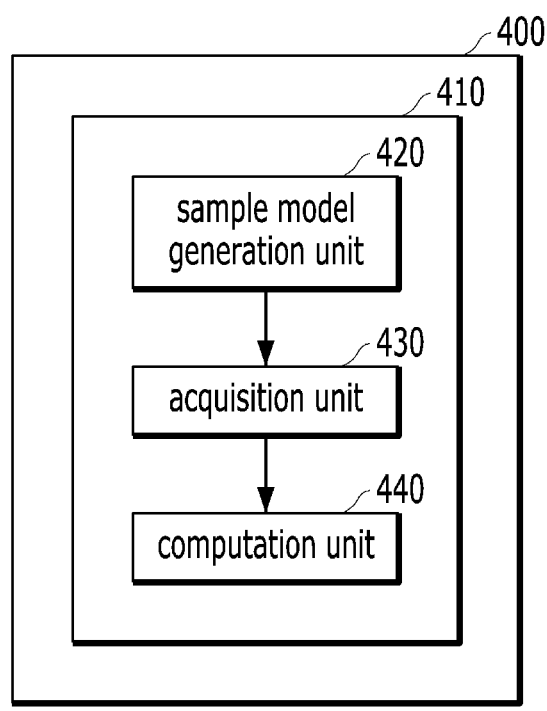
FIG. 4 is a second exemplary diagram of a processor for accelerating ray casting according to an embodiment of the present invention.

FIG. 4 is a second diagram of an apparatus 400 for accelerating ray casting according to an embodiment of the present invention.

Referring to FIG. 4, the apparatus 400 for accelerating ray casting according to another embodiment of the present invention may include a processor 410, and the processor 410 may include a sample model generation unit 420, an acquisition unit 430, and a computation unit 440. The example of FIG. 4 illustrates a technology for rapidly skipping an empty volume using a first direction and a second direction, i.e., both directions.

The sample model generation unit 420 collects information about the surfaces of an effective volume from overall volume data, and generates a surface model. In this case, the overall volume data refers to the data of an overall volume space in which an effective volume and an empty volume are present together.

In this case, the sample model generation unit 420 may divide the overall volume data into a plurality of blocks each including a plurality of voxels, may identify a surface of an effective block that belongs to the plurality of blocks and satisfies reference conditions (which refer to the maximum and minimum conditions of opacity) in each reference direction (which refers to each of the x, y, and z directions, i.e., each of the y-z plane, the x-z plane, and the x-y plane), may collect information about the identified surfaces of the effective block, and then may generate the surface model.

In this case, the reference conditions refer to the maximum and minimum conditions of opacity. As an example, as described above, the maximum and minimum conditions of opacity may be set based on brightness values. That is, for example, when the minimum condition of opacity is a brightness value equal to or higher than level 4 and the maximum condition of opacity is a brightness value equal to or lower than level 9, the effective block may be a block that corresponds to one of levels 4 to 9.

Figure 11:
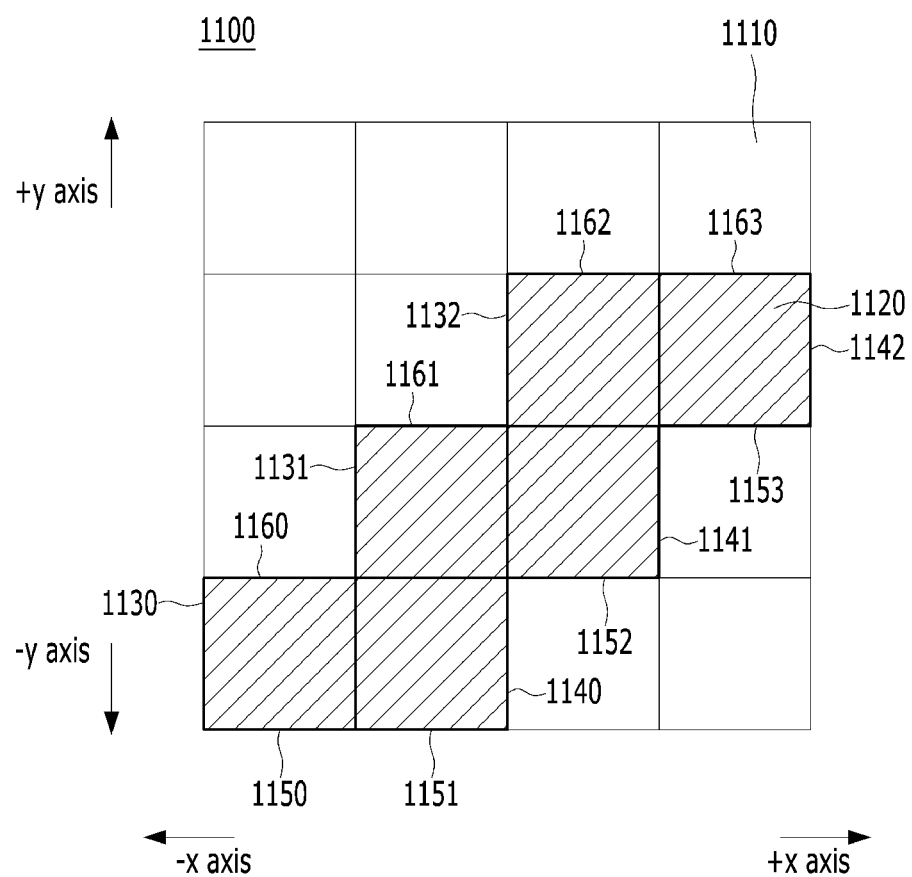
FIG. 11 is a diagram showing an example of the generation of a surface model according to an embodiment of the present invention.

FIG. 11 is a diagram showing an example of the generation of a surface model according to an embodiment of the present invention.

Referring to FIG. 11, FIG. 11 shows an example of the x-y plane when an overall volume data 1100 is viewed in the z-axis direction.

In this case, the overall volume data 1100 may be divided into a plurality of blocks, and may be classified into transparent blocks 1110 and effective blocks 1120. In this case, each of the effective blocks 1120 refers to a block in which an effective volume is located.

Furthermore, the surface model generation unit 420 may generate a surface model by identifying a surface of an effective block in each reference direction. As an example: when a surface of an effective block is identified in the +x-axis direction, first surfaces 1130, 1131 and 1132 may be identified; when a surface of an effective block is identified in the −x-axis direction, second surfaces 1140, 1141 and 1142 may be identified; when a surface of an effective block is identified in the +y-axis direction, third surfaces 1150, 1151, 1152 and 1153 may be identified; and when a surface of an effective block is identified in the −y-axis direction, fourth surfaces 1160, 1161, 1162 and 1163 may be identified. Furthermore, in the same manner, surfaces of an effective block may be also identified in the +z-axis and −z-axis directions.

In this case, since the size of an overall surface model is excessively large when the entire effective blocks 1120 are formed into the surface model, the surface model generation unit 420 according to an embodiment of the present invention identifies only the edges (that is, the portions of the thick contour lines in the drawing) of the effective blocks 1120 and then generates a surface model, as shown in the example of FIG. 11.

The acquisition unit 430 acquires the depth information of the pixel for the surface model in each of a first direction (a forward direction) and a second direction (a reverse direction) in order to apply ray casting for the surface model to each of the pixels of a 2D scene corresponding to a viewpoint (that is, the direction of viewing). In this case, the depth information refers to the distance to a location at which an effective volume is located in three dimensions in the first or second direction of the overall volume data. The acquisition unit 430 may acquire depth information in each of the first and second directions by performing surface rendering in each of the first and second directions.

Furthermore, the acquisition unit 430 may perform parallel execution by allocating the pixels to a plurality of multiprocessor cores that are capable of performing parallel operation. That is, the acquisition unit 430 may acquire the depth information of each pixel from the surface model, generated by the surface model generation unit 420, through hardware acceleration.

Thereafter, the computation unit 440 calculates the length information of the effective section (that is, an opaque volume section) of each of the pixels for the application of ray casting using the depth information that is acquired in each of the first and second directions.

In this case, the computation unit 440 may calculate the length information of the effective section of the pixel by taking into account first depth information acquired for the first direction, second depth information acquired for the second direction, and a reference length determined by the viewpoint. In this case, the reference length is determined by taking into account relative location information about a location at which the pixel is located within the overall volume data and the viewpoint, and refers to a maximum length or a total length that may be acquired from the corresponding pixel.

Figure 12:
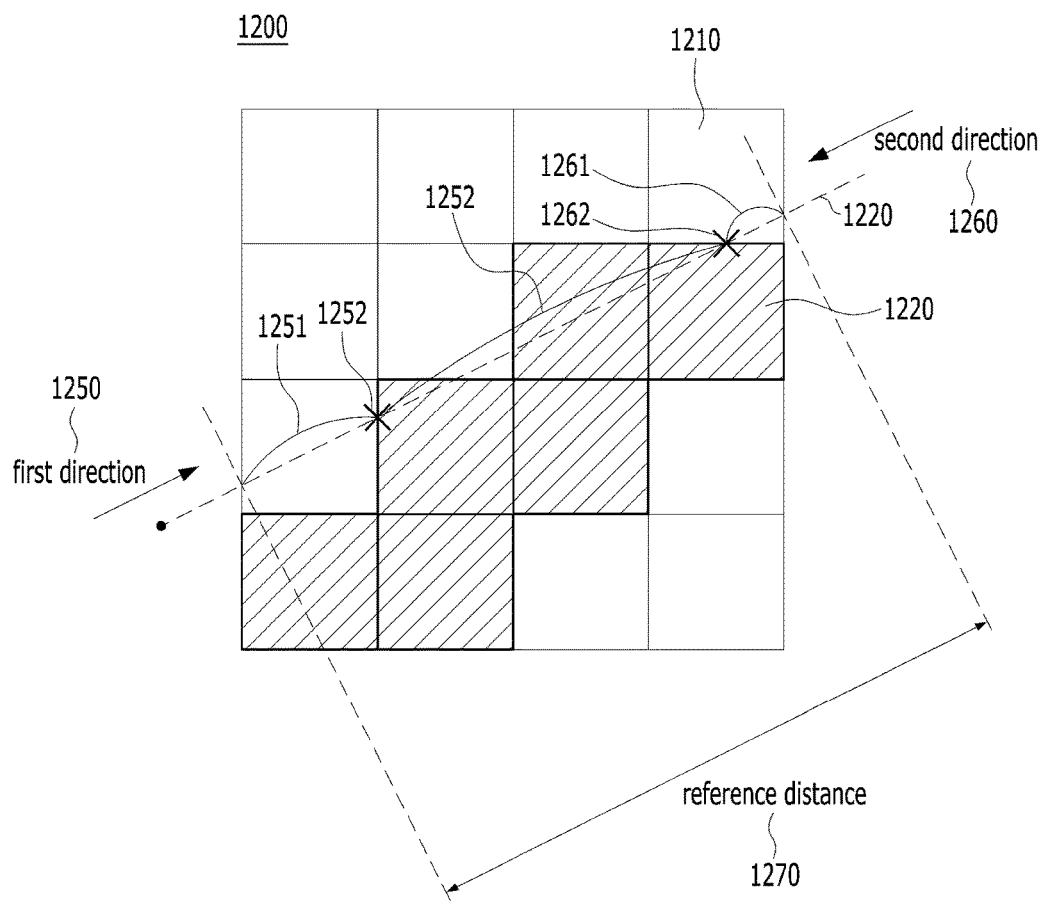
FIG. 12 is a diagram showing an example of the acquisition of depth information according to an embodiment of the present invention.

FIG. 12 is a diagram showing an example of the acquisition of depth information according to an embodiment of the present invention.

Referring to FIG. 12, as an example, when the overall volume data 1200 is classified into transparent blocks 1210 and effective blocks 1220 and the propagation path 1240 of a ray for any one pixel 1230 of a 2D scene is as shown in FIG. 12, the value of the first depth information 1251 in a first direction 1250 may be acquired via the distance to a first intersection 1252, and the value of the second depth information 1261 in a second direction 1260 may be acquired via the distance to a second intersection 1262. Furthermore, the computation unit 440 may calculate the length information 1280 of the effective section of the ray for the corresponding pixel 1230 by subtracting the value of the first depth information 1251 and the value of the second depth information 1261 from the value of the reference distance 1270 corresponding to the pixel 1230.

Figure 5:
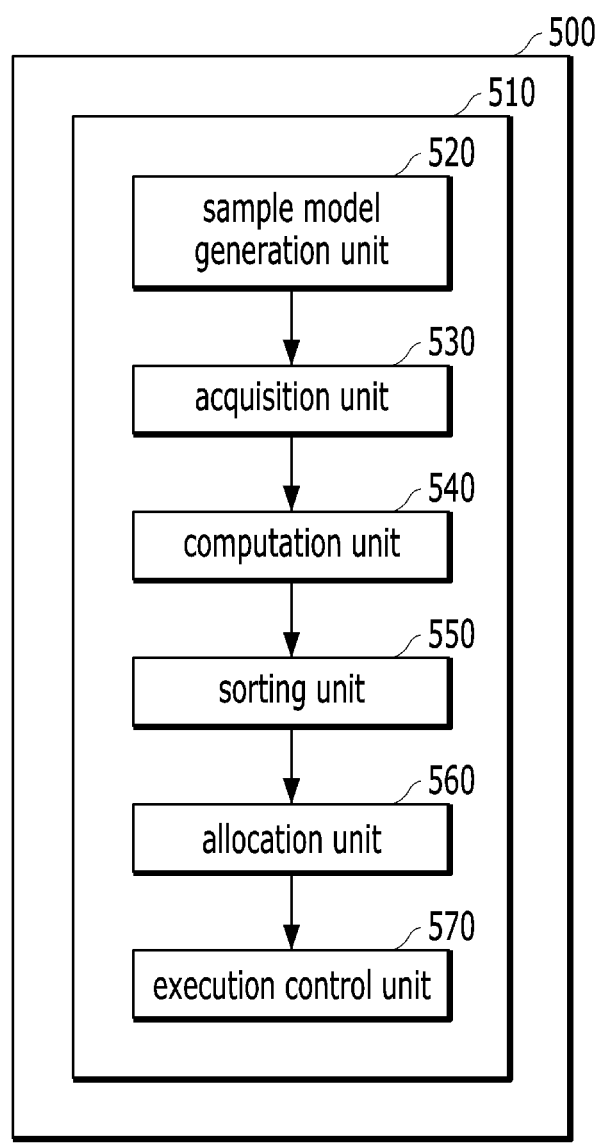
FIG. 5 is a third exemplary diagram of a processor for accelerating ray casting according to an embodiment of the present invention.

FIG. 5 is a third diagram of an apparatus 500 for accelerating ray casting according to an embodiment of the present invention.

Referring to FIG. 5, the apparatus 500 for accelerating ray casting according to the embodiment of the present invention may include a processor 510, and the processor 510 may include a sample model generation unit 520, an acquisition unit 530, a computation unit 540, a sorting unit 550, an allocation unit 560, and an execution control unit 570.

In this case, the sample model generation unit 520, the acquisition unit 530 and the computation unit 540 of FIG. 5 are the same as the sample model generation unit 420, the acquisition unit 430 and the computation unit 440 shown in FIG. 4. Furthermore, the computation unit 540, the sorting unit 550, the allocation unit 560, and the execution control unit 570 are the same as the computation unit 320, the sorting unit 330, the allocation unit 340, and the execution control unit 350 shown in FIG. 3. That is, the apparatus 500 for accelerating ray casting shown in FIG. 5 may be constructed using a configuration in which the configuration shown in FIG. 3 is combined with the configuration shown in FIG. 4, and thus is described in brief below.

The apparatus 500 for accelerating ray casting according to the embodiment of the present invention may generate a surface model by collecting information about the surfaces of an effective volume from overall volume data via the model generation unit 520; may acquire depth information for each of the pixels of a 2D scene corresponding to a viewpoint for the surface model in each of the first and second directions in order to apply ray casting for the surface model to the pixel via the acquisition unit 530; and may calculate the length information of the effective section of the pixel for the application of ray casting using the depth information acquired in each of the first and second directions via the computation unit 540.

In this case, the length information of the effective section may be calculated by using the distance between intersections at which the ray intersects the effective volume in each of the first and second directions or by counting the number of effective voxels that the ray intersects within the effective volume. Since this has been described above, a description thereof is omitted below.

Furthermore, after calculating the length information of the effective section of each of the pixels via the computation unit 540, the apparatus 500 for accelerating ray casting according to an embodiment of the present invention may sort the ray based on the length information of the effective section in which the ray intersects the effective volume via the sorting unit 550, may allocate the sorted rays to respective thread groups having a parallel multiprocessor structure in order of the sorting via the allocation unit 560, and may transfer control instructions to the allocated thread groups so that the allocated thread groups execute ray casting for the sorted rays via the execution control unit 570.

Furthermore, although not shown in FIG. 5, the apparatus 500 for accelerating ray casting according to an embodiment of the present invention may further include a mapping unit (not shown) configured to map the results of the ray casting for the sorted rays to respective pixels that belong to the pixels of the 2D scene and correspond to the sorted rays, and a scene generation unit (not shown) configured to generate the 2D scene by combining mapped pixel scenes.

In the following, the operation flow of a method of accelerating ray casting according to an embodiment of the present invention is described in brief based on the above-detailed description.

Figure 13:
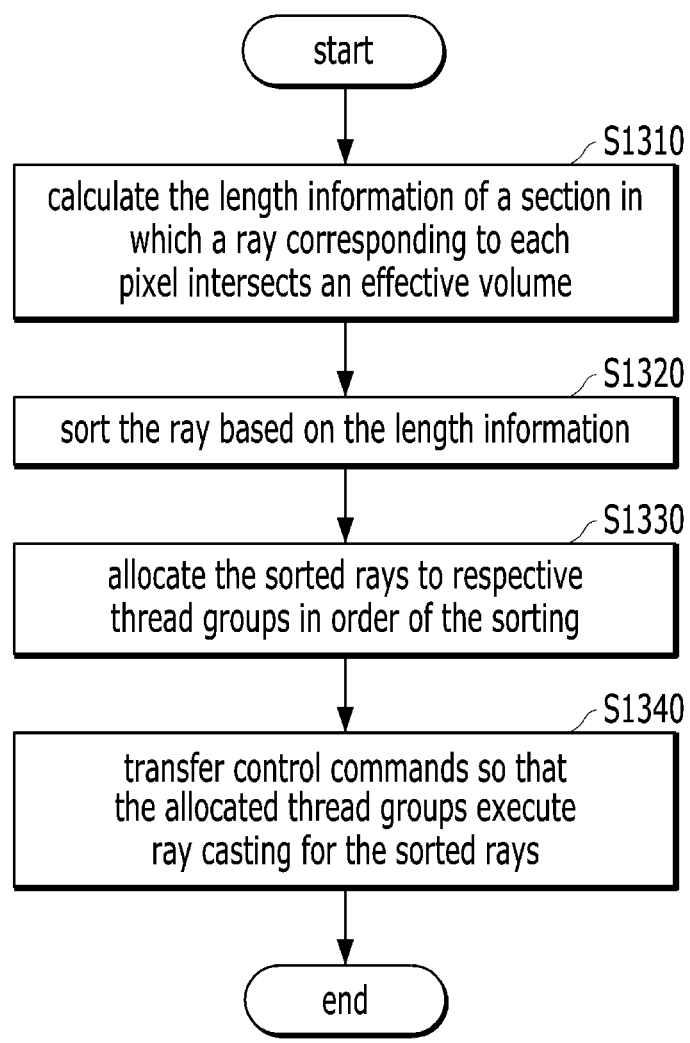
FIG. 13 is a first exemplary operation flowchart of a method of accelerating ray casting according to an embodiment of the present invention.

FIG. 13 is a first operation flowchart of a method of accelerating ray casting according to an embodiment of the present invention. This is described in brief based on the descriptions given in conjunction with FIG. 3.

Referring to FIG. 13, first, the method of accelerating ray casting according to the embodiment of the present invention may include step S1310 of calculating, by the computation unit 320, the length information of a section in which a ray corresponding to each of the pixels of a 2D scene corresponding to a viewpoint (the direction of viewing) intersects an effective volume in order to apply ray casting to the pixel.

In this case, the computation unit 320 may calculate the length information of the section in which the ray intersects the effective volume by using the distance between intersections at which the ray intersects the effective volume in first and second directions or by counting the number of effective voxels that the ray intersects within the effective volume.

Furthermore, the computation unit 320 may calculate length information for the ray by generating voxels, which belong to voxels intersected by the ray and whose brightness value satisfies reference conditions, as the effective volume. Since this has been described in detail above, a description thereof is omitted below.

The method of accelerating ray casting according to the embodiment of the present invention may further include step S1320 of sorting, by the sorting unit 330, the ray based on the length information of the section which is calculated at step S1310 and in which the ray intersects the effective volume. In this case, the sorting unit 330 may sort rays corresponding to the respective pixels of a 2D scene in descending order of length information or in ascending order of length information.

Although not shown in the drawing, the method of accelerating ray casting according to the embodiment of the present invention may further include the step of grouping, by the grouping unit (not shown), the rays, sorted at step S1320, according to preset rules after step S1320. Since this has been described above, a description thereof is omitted below.

The method of accelerating ray casting according to the embodiment of the present invention may further include step S1330 of allocating, by the allocation unit 340, the rays, sorted at step S1320, to thread groups having a parallel multiprocessor structure in order of the sorting. In this case, the allocation unit 340 may allocate the individual sorted rays to thread groups, or may allocate ray groups of a predetermined number of grouped rays to thread groups.

The method of accelerating ray casting according to the embodiment of the present invention may further include step S1340 of transferring, by the execution control unit 350, control instructions to the allocated thread groups so that the thread groups allocated at step S1330 can execute ray casting for the sorted rays.

Thereafter, although now shown in FIG. 13, the method of accelerating ray casting according to the embodiment of the present invention may further include the step of mapping, by the mapping unit (not shown), the results of the ray casting for the sorted rays to respective pixels that belong to the pixels of the 2D scene and correspond to the sorted rays. Furthermore, the method of accelerating ray casting according to the embodiment of the present invention may further include the step of generating, by the scene generation unit, a 2D scene by combining mapped pixel scenes after the step of mapping the results of the ray casting.

Figure 14:
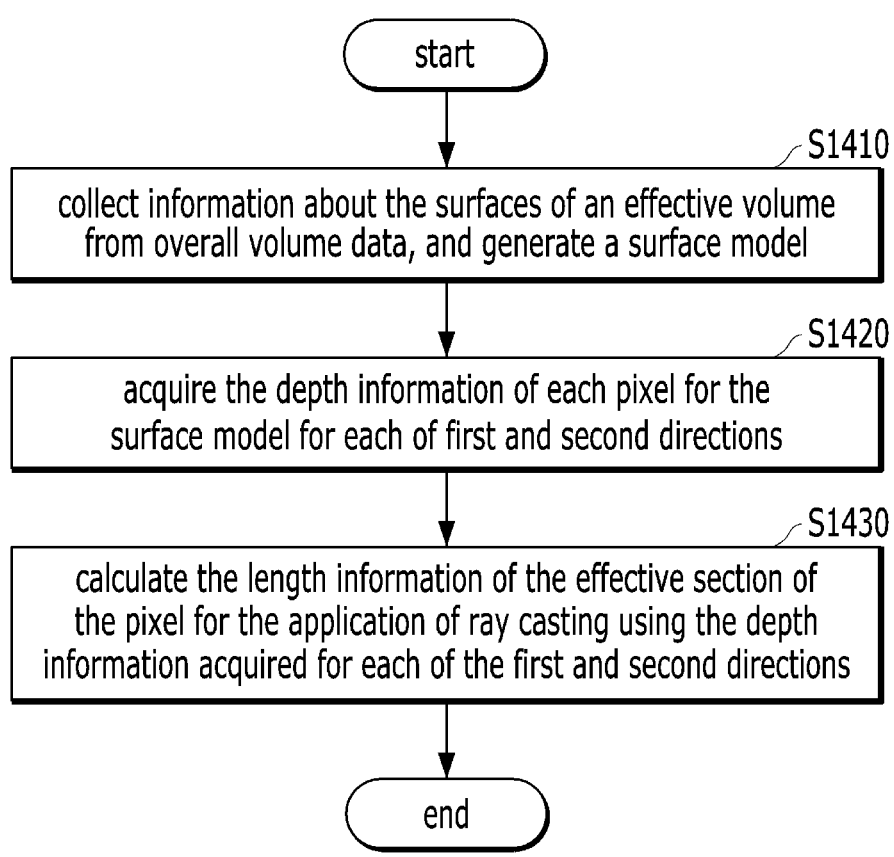
FIG. 14 is a second exemplary operation flowchart of a method of accelerating ray casting according to another embodiment of the present invention.

FIG. 14 is a second operation flowchart of a method of accelerating ray casting according to another embodiment of the present invention. This is described in brief based on the description given in conjunction with FIG. 4 above.

First, the method of accelerating ray casting according to the embodiment of the present invention may include step S1410 of generating, by the generation unit 420, a surface model by collecting information about the surfaces of an effective volume from overall volume data.

In this case, the sample model generation unit 420 may divide the overall volume data into a plurality of blocks each including a plurality of voxels, may identify a surface of an effective block that belongs to the plurality of blocks and satisfies reference conditions (which refer to the maximum and minimum conditions of opacity) in each reference direction, may collect information about the identified surfaces of the effective block, and then may generate a surface model.

The method of accelerating ray casting according to the embodiment of the present invention may further include step S1420 of acquiring, by the acquisition unit 430, the depth information of each of the pixels of a 2D scene corresponding to a viewpoint for the surface model in each of first and second directions in order to apply ray casting for the surface model to the pixel.

In this case, the depth information refers to the distance to a location at which an effective volume is located in three dimensions in the first or second direction of the overall volume data. The acquisition unit 430 may acquire depth information in each of the first and second directions by performing surface rendering in each of the first and second directions.

The method of accelerating ray casting according to the embodiment of the present invention may further include step S1430 of calculating, by the computation unit 440, the length information of the effective section (that is, an opaque volume section) of each of the pixels for the application of ray casting using the depth information that is acquired in each of the first and second directions.

In this case, the computation unit 440 may calculate the length information of the effective section of the pixel by taking into account first depth information acquired for the first direction, second depth information acquired for the second direction, and a reference length determined by the viewpoint. Since this has been described in detail above, a description thereof is omitted below.

Furthermore, although not shown in FIG. 14, steps 1320 to S1340 of FIG. 13 may be performed after step S1430 as desired. Since this has been described in detail above, a description thereof is omitted below.

The method of accelerating ray casting according to an embodiment of the present invention may be implemented in the form of program instructions that can be executed by a variety of computer means, and may be stored in a computer-readable storage medium. The computer-readable storage medium may include program instructions, a data file, and a data structure solely or in combination. The program instructions that are stored in the medium may be designed and constructed particularly for the present invention, or may be known and available to those skilled in the field of computer software. Examples of the computer-readable storage medium include magnetic media such as a hard disk, a floppy disk and a magnetic tape, optical media such as CD-ROM and a DVD, magneto-optical media such as a floptical disk, and hardware devices particularly configured to store and execute program instructions such as ROM, RAM, and flash memory. Examples of the program instructions include not only machine language code that is constructed by a compiler but also high-level language code that can be executed by a computer using an interpreter or the like. The above-described hardware components may be configured to act as one or more software modules that perform the operation of the present invention, and vice versa.

The present invention has the advantage of providing a method and apparatus for accelerating ray casting, more particularly a method and apparatus for accelerating ray casting, which are capable of improving the speed of volume rendering.

The present invention has the advantage of providing a technology that is capable of improving the speed of rendering using ray casting in a GPU, multi-core, or parallel processing environment.

The present invention has the advantage of accelerating ray casting by allocating an output pixel block of rays requiring similar operation times to a single thread group.

The present invention has the advantage of reducing total work time by minimizing work time per block in a General-Purpose computing on Graphics Processing Units (GPGPU) device, such as a Compute Unified Device Architecture (CUDA).

The present invention has the advantage of calculating the length information of a section in which a ray corresponding to each of the pixels of a 2D scene corresponding to a viewpoint intersects an effective volume in order to apply ray casting to the pixel, sorting the ray based on the length information of the section in which the ray intersects the effective volume, and allocating the sorted rays to respective thread groups having a parallel multiprocessor structure to order of the sorting, thereby achieving the advantage of improving the speed of rendering.

The present invention has the advantage of generating a surface model by collecting information about the surfaces of an effective volume from overall volume data, acquiring depth information in each of the pixels of a 2D scene corresponding to a viewpoint for the surface model in each of the first and second directions in order to apply ray casting for the surface model to the pixel, and calculating the length information of the effective section of the pixel for the application of ray casting using the depth information acquired in each of the first and second directions, thereby enabling a transparent area to be skipped during ray casting and thus achieving the advantage of enabling high-speed rendering.

The present invention has the advantage of providing a rendering technology that is applicable to a medical imaging field.

The present invention was derived from research conducted as part of the Robot Industry Convergence Core Technology Development Project sponsored by the Korean Ministry of Trade, Industry and Energy and the Korea Institute of Industrial Technology Evaluation and Planning [Project Management Number: 10041618; Project Name: Development of Abdominal and Thoracic 1 cm-sized Lesion Biopsy and Treatment Needle Insertion-type Image Intervention Robot System for a Reduction in Exposure to Radioactive Rays and the Improvement of Treatment Accuracy].

While the present invention has been described in conjunction with specific details, such as specific elements, and limited embodiments and diagrams, above, these are provided merely to help an overall understanding of the present invention. The present invention is not limited to these embodiments, and various modifications and variations can be made based on the foregoing description by those having ordinary knowledge in the art to which the present invention pertains.

Therefore, the technical spirit of the present invention should not be determined based only on the described embodiments, and the following claims, all equivalents to the claims and equivalent modifications should be construed as falling within the scope of the spirit of the present invention.

What is claimed is:

1. A method of accelerating ray casting in a computing system, comprising:
    calculating, by a processor in the computing system, length information of a section in which a ray corresponding to each pixel of a two-dimensional (2D) scene corresponding to a viewpoint intersects an effective volume having an influence on an amount of rendering computation in order to apply ray casting to the pixel;
    sorting, by the processor, the ray based on the length information of the section in which the ray intersects the effective volume, wherein the sorting of the ray based on the length information of the section causes the ray to be sorted based on an operation time required for processing; and
    allocating, by the processor, the sorted rays to thread groups having a parallel multiprocessor structure in order of the sorting.

2. The method of claim 1, further comprising performing, by the processor, ray casting for the sorted rays using the allocated thread groups.

3. The method of claim 2, further comprising:
    mapping, by the processor, results of the ray casting for the sorted rays to respective pixels that belong to the pixels of the 2D scene and correspond to the sorted rays; and
    generating, by the processor, the 2D scene by combining mapped pixel scenes.

4. The method of claim 1, wherein the calculating length information of the section in which the ray intersects the effective volume comprises:
    acquiring, by the processor, a first intersection at which the ray intersects the effective volume in a first direction;
    acquiring, by the processor, a second intersection at which the ray intersects the effective volume in a second direction; and
    generating, by the processor, for the ray, a distance between the first intersection and the second intersection as the length information.

5. The method of claim 1, wherein the calculating length information of the section in which the ray intersects the effective volume comprises:
    counting, by the processor, a number of effective voxels that the ray intersects within the effective volume; and
    generating, by the processor, the number of effective voxels counted for the ray as the length information.

6. The method of claim 1, wherein the calculating length information of the section in which the ray intersects the effective volume comprises:
    generating, by the processor, first voxels which belong to voxels intersected by the ray and whose brightness value satisfies reference conditions as the effective volume.

7. A method of accelerating ray casting in a computing system, comprising:
    collecting, by a processor in the computing system, information about surfaces of an effective volume from overall volume data;
    generating, by the processor, a surface model based on the information about surfaces of the effective volume;
    acquiring, by the processor, depth information of each pixel corresponding to a viewpoint in each of first and second directions in order to apply ray casting for the surface model to the pixel corresponding to the viewpoint for the surface model, wherein the depth information of each pixel is acquired by performing surface rendering corresponding to the viewpoint for the surface model, and the depth information of each pixel is acquired in parallel operations allocated for each pixel; and
    calculating, by the processor, length information of an effective section with respect to the pixel for application of ray casting using the depth information acquired in each of the first and second directions.

8. The method of claim 7, wherein the generating the surface model comprises:
    dividing, by the processor, the overall volume data into a plurality of blocks each including a plurality of voxels;
    identifying, by the processor, a surface of an effective block which belongs to the plurality of blocks and which satisfies reference conditions for each reference direction;
    collecting, by the processor, information about the identified surfaces of the effective block; and
    generating, by the processor, the surface model based on the information about the identified surfaces of the effective block.

9. The method of claim 7, wherein the calculating length information of the effective section of the pixel comprises calculating, by the processor, the length information of the effective section of the pixel by taking into account first depth information acquired for the first direction, second depth information acquired for the second direction, and a reference length determined by the viewpoint.

10. The method of claim 9, wherein the reference length is determined by taking into account information about a relative location at which the pixel is located within the overall volume data and the viewpoint.

11. The method of claim 7, wherein the acquiring depth information of each pixel for the surface model is performed in parallel by allocating the pixels to a plurality of respective multiprocessor cores capable of performing parallel operations.

12. A processor in a computing system for accelerating ray casting, configured to:
    calculate length information of a section in which a ray corresponding to each pixel of a two-dimensional (2D) scene corresponding to a viewpoint intersects an effective volume having an influence on an amount of rendering computation in order to apply ray casting to the pixel;
    sort the ray based on the length information of the section in which the ray intersects the effective volume, wherein the sorting of the ray based on the length information of the section causes the ray to be sorted based on an operation time required for processing;
    allocate the sorted rays to respective thread groups having a parallel multiprocessor structure in order of the sorting; and
    transfer control instructions to the allocated thread groups so that the allocated thread groups execute ray casting for the sorted rays.

13. The processor of claim 12, wherein the processor is further configured to:
- acquire a first intersection at which the ray intersects the effective volume in a first direction;
- acquire a second intersection at which the ray intersects the effective volume in a second direction; and
- generate, for the ray, a distance between the first intersection and the second intersection as the length information.

14. The processor of claim 12, wherein the processor is further configured to generate first voxels which belong to voxels intersected by the ray and whose brightness value satisfies reference conditions as the effective volume.

15. A processor in a computing system for accelerating ray casting, configured to:
- collect information about surfaces of an effective volume from overall volume data;
- generate a surface model based on the information about surfaces of the effective volume;
- acquire depth information of each pixel corresponding to a viewpoint for the surface model in each of first and second directions in order to apply ray casting to the pixel corresponding to the viewpoint for the surface model, wherein the depth information of each pixel is acquired by performing surface rendering corresponding to the viewpoint for the surface model, and the depth information of each pixel is acquired in parallel operations allocated for each pixel; and
- calculate length information of an effective section with respect to the pixel for application of ray casting using the depth information acquired in each of the first and second directions.

* * * * *